(12) United States Patent
Yajima

(10) Patent No.: US 12,237,769 B2
(45) Date of Patent: Feb. 25, 2025

(54) POWER CONVERSION CIRCUIT, SEMICONDUCTOR DEVICE, AND ELECTRONIC DEVICE

(71) Applicant: JAPAN SCIENCE AND TECHNOLOGY AGENCY, Kawaguchi (JP)

(72) Inventor: Takeaki Yajima, Fukuoka (JP)

(73) Assignee: JAPAN SCIENCE AND TECHNOLOGY AGENCY, Kawaguchi (JP)

( * ) Notice: Subject to any disclaimer, the term of this patent is extended or adjusted under 35 U.S.C. 154(b) by 246 days.

(21) Appl. No.: 17/926,674

(22) PCT Filed: May 26, 2021

(86) PCT No.: PCT/JP2021/019949
§ 371 (c)(1),
(2) Date: Nov. 21, 2022

(87) PCT Pub. No.: WO2021/241622
PCT Pub. Date: Dec. 2, 2021

(65) Prior Publication Data
US 2023/0198398 A1    Jun. 22, 2023

(30) Foreign Application Priority Data
May 29, 2020 (JP) .............................. 2020-094139

(51) Int. Cl.
*H02M 1/08* (2006.01)
*H02M 1/00* (2006.01)
*H02M 3/158* (2006.01)

(52) U.S. Cl.
CPC ......... *H02M 3/158* (2013.01); *H02M 1/0009* (2021.05); *H02M 1/08* (2013.01)

(58) Field of Classification Search
CPC ....... H02M 3/158; H02M 1/0009; H02M 1/08
See application file for complete search history.

(56) References Cited

U.S. PATENT DOCUMENTS

2008/0036432 A1   2/2008  Takada et al.
2010/0165686 A1   7/2010  Matzberger et al.
(Continued)

FOREIGN PATENT DOCUMENTS

JP    2008-043146 A    2/2008
JP    2019-502348 A    1/2019
(Continued)

OTHER PUBLICATIONS

Na Kong et al., "Resistive Impedance Matching Circuit for Piezo-electric Energy Harvesting", Journal of Intelligent Material Systems and Structures, vol. 21, pp. 1293-1302, Sep. 2010 (cited in the specification).
(Continued)

*Primary Examiner* — Adolf D Berhane
(74) *Attorney, Agent, or Firm* — WHDA, LLP

(57) ABSTRACT

A power conversion circuit includes a first capacitor coupled between an input terminal and a reference potential, a second capacitor coupled between an output terminal and a reference potential, an inductor coupled between the input terminal and the output terminal, storing magnetic field energy when at least part of an input current and a current output from the first capacitor flows through the inductor as a first current, and inducing a second current for charging the second capacitor by the magnetic field energy, and a switching element that is turned on and off at a substantially constant cycle, has a substantially constant period during which the switching element is ON in one cycle, is turned on to cause the first current to flow through the inductor, and is OFF when the second current flows through the inductor.

7 Claims, 10 Drawing Sheets

(56) References Cited

U.S. PATENT DOCUMENTS

| | | |
|---|---|---|
| 2019/0379227 A1 | 12/2019 | Oonishi et al. |
| 2020/0258707 A1 | 8/2020 | Su et al. |
| 2021/0218351 A1 | 7/2021 | Toshiyoshi et al. |
| 2024/0014815 A1* | 1/2024 | Yajima ................. H03K 17/063 |

FOREIGN PATENT DOCUMENTS

| | | |
|---|---|---|
| JP | 2019-144729 A | 8/2019 |
| JP | 2019-213296 A | 12/2019 |
| JP | 2019-216584 A | 12/2019 |

OTHER PUBLICATIONS

International Search Report dated Jul. 13, 2021, issued in counterpart International Application No. PCT/JP2021/019949.

* cited by examiner

POWER CONVERSION CIRCUIT, SEMICONDUCTOR DEVICE, AND ELECTRONIC DEVICE

FIELD

The present disclosure relates to a power conversion circuit, a semiconductor device, and an electronic device.

BACKGROUND

A power conversion circuit such as an alternating current (AC)-direct current (DC) converter or a DC-DC converter is used to convert electric power generated by an energy harvesting device such as a vibration power generation device. It is known that impedance matching is performed when electric power generated by a vibration power generation device using a piezoelectric element is AC-DC converted (for example, Non-Patent Document 1).

PRIOR ART DOCUMENT

Non Patent Document

Non-Patent Document 1: Journal of Intelligent Material Systems and Structures, Vol. 21, pp. 1293 to 1301, September, 2010

SUMMARY

In the energy harvesting device, since the power generation amount varies from moment to moment, the input current input to the power conversion circuit varies from moment to moment. The input impedance of the power conversion circuit varies with the variation in the input current, and it becomes difficult to match the output impedance of the energy harvesting device and the input impedance of the power conversion circuit. In Non-Patent Document 1, the input impedance is autonomously matched with the output impedance of the energy harvesting device in a step-up or step-down DC-DC converter in which the current flowing through the inductor is discontinuous. Therefore, the switching cycle is set to be constant, and the inductance of the inductor and the like are set to predetermined values.

A first problem will be described. In Non-Patent Document 1, since power generation by an inorganic piezoelectric element having a large capacitance component is assumed, a primary capacitor is not provided in the power conversion circuit. However, in some energy harvesting devices, a primary capacitor is provided at the input terminal of the power conversion circuit to stabilize the input voltage. When an element having a small capacitance component, such as an organic piezoelectric element or a MEMS element, is used, a primary capacitor may be provided. Preferred ranges for the inductance of the inductor and the capacitance of the primary capacitor to facilitate impedance matching when the primary capacitor is provided are not known. If the impedances cannot be matched, the power conversion efficiency is reduced.

A second problem will be described. In addition, as in Non-Patent Document 1, it may be difficult to set the inductance of the inductor or the like within a predetermined range. For example, when the temporal variation of the output of the power generation device is fast, the method of making the switching cycle constant requires setting the switching frequency high, which increases the power consumption. When the power consumption is to be reduced, the inductance of the inductor or the like deviates from the predetermined range, and thus impedance matching may be impossible. When the impedances are not matched, the power conversion efficiency decreases.

The present invention has been made in view of above problems, and an object thereof is to improve power conversion efficiency.

According to one aspect of the present disclosure, there is provided a power conversion circuit including: an input terminal to which an input current is input; an output terminal from which an output voltage is output; a first capacitor having one end coupled to the input terminal and another end coupled to a reference potential; a second capacitor having one end coupled to the output terminal and another end coupled to a reference potential; an inductor that has one end coupled to the one end of the first capacitor and another end coupled to the one end or the another end of the second capacitor, stores magnetic field energy when at least part of the input current and a current output from the first capacitor flows through the inductor as a first current, and induces a second current for charging the second capacitor by the magnetic field energy; and a switching element that is turned on and off at a substantially constant cycle, has a substantially constant period during which the switching element is ON in one cycle, is turned on to cause the first current to flow through the inductor, and is OFF when the second current flows through the inductor, wherein $C1 < (T2^2/(2\times L))/(\omega \times T1)$ is satisfied where a capacitance of the first capacitor is represented by $C1$, an inductance of the inductor is represented by $L$, the cycle is represented by $T1$, a length of the period during which the switching element is ON during one cycle of the cycle is represented by $T2$, and an angular frequency of the input current is represented by $\omega$.

In the above configuration, a configuration in which $C1 > T2^2/(2\times L)$ is satisfied may be employed.

In the above configuration, a configuration in which $C1 < (T2^2/(2\times L))/(5\times \omega \times T1)$ is satisfied may be employed.

In the above configuration, a configuration in which $C1 > 5\times T2^2/(2\times L)$ is satisfied may be employed.

In the above configuration, a configuration in which the input current is a current generated by a vibration power generation device may be employed.

In the above configuration, a configuration in which when the vibration power generation device outputs a direct current power, a capacitance of the vibration power generation device is smaller than $C1$, and when the vibration power generation device outputs an alternating current power, the capacitance of the vibration power generation device via a rectifier circuit is smaller than $C1$ may be employed.

The present invention is a power conversion circuit including: a voltage conversion circuit that starts a voltage conversion operation when an input voltage applied to an input terminal reaches a threshold voltage, the voltage conversion operation converting the input voltage and outputting a converted input voltage to an output terminal as an output voltage, wherein the threshold voltage when an input current input to the input terminal is large is higher than the threshold voltage when the input current is small.

In the above configuration, a configuration in which a setting circuit that sets the threshold voltage based on the input current input to the input terminal so that the threshold voltage when the input current is large is higher than the threshold voltage when the input current is small, and a determination circuit that determines whether the input voltage has reached the threshold voltage are provided, and the power conversion circuit starts the voltage conversion operation based on an output of the determination circuit may be employed.

In the above configuration, a configuration in which the voltage conversion circuit includes: a capacitor having one end coupled to the output terminal and another end coupled to a reference potential, an inductor having one end coupled to the input terminal and another end coupled to either the one end or the another end of the capacitor, storing magnetic field energy when at least a part of the input current flows through the inductor as a first current, and inducing a second current by the magnetic field energy, and a switching element that is turned on to cause the first current to flow through the inductor, and is OFF when the second current flows through the inductor may be employed.

In the above configuration, a configuration in which a control circuit that turns on the switching element when the input voltage reaches the threshold voltage is provided may be employed.

In the above configuration, a configuration in which $0.3 \times Zout \leq Vth/Iin \leq 3 \times Zout$ is satisfied, where Zout represents an output impedance of a power supply coupled to the input terminal, and Vth represents the threshold voltage when the input current input to the input terminal is Iin may be employed.

According to another aspect of the present disclosure, there is provided a semiconductor device including: the above power conversion circuit; and a functional circuit related to the power conversion circuit.

According to another aspect of the present disclosure, there is provided an electronic device including: the above power conversion circuit; and a functional unit to which power is supplied from the power conversion circuit.

Advantages

The present invention can improve power conversion efficiency.

DESCRIPTION OF EMBODIMENTS

Hereinafter, embodiments will be described with reference to the drawings.

First Embodiment

A first embodiment for solving the first problem will be described. A power conversion circuit in accordance with the first embodiment includes a primary capacitor. Preferred ranges of the inductance of the inductor, the capacitance of the primary capacitor, and the like in the power conversion circuit in which the switching cycle is constant and the input impedance is autonomously matched with the output impedance of a power generation device will be described.

Figure 1:
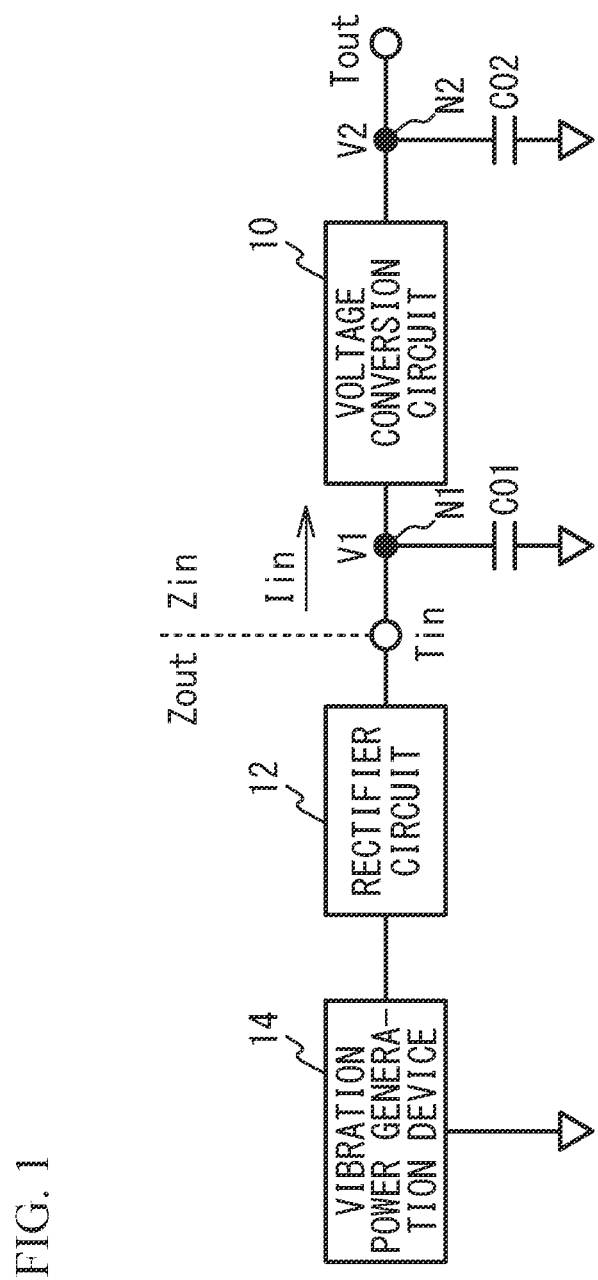
FIG. 1 is a block diagram of a vibration power generation system using a power conversion circuit in accordance with first and second embodiments and variations thereof.

FIG. 1 is a block diagram of a vibration power generation system using a power conversion circuit in accordance with first and second embodiments and variations thereof. The power conversion circuit includes a voltage conversion circuit 10, a control circuit 20 to be described later with reference to FIG. 3A to FIG. 3C, and the like. Although capacitors C01 and C02 are included in the voltage conversion circuit 10, they are illustrated outside the voltage conversion circuit 10 in FIG. 1. As illustrated in FIG. 1, the vibration power generation system includes a vibration power generation device 14, a rectifier circuit 12, and the voltage conversion circuit 10. The vibration power generation device 14 is provided on, for example, a road or a bridge, and generates electric power by vibration when a pedestrian, a vehicle, or the like passes. The rectifier circuit 12 rectifies the generated power. The voltage conversion circuit 10 converts the voltage of the rectified power.

The primary capacitor C01 is coupled to the input node Tin of the voltage conversion circuit 10, and the secondary capacitor C02 is coupled to the output node Tout. An input current Iin is input to the input terminal Tin from the rectifier circuit 12. The voltage conversion circuit 10 converts the voltage V1 of the input terminal Tin into a voltage V2. The output voltage V2 is output from the output terminal Tout. The input impedance of the voltage conversion circuit 10 is Zin, and the output impedance of the vibration power generation device 14 via the rectifier circuit 12 is Zout.

Figure 2:
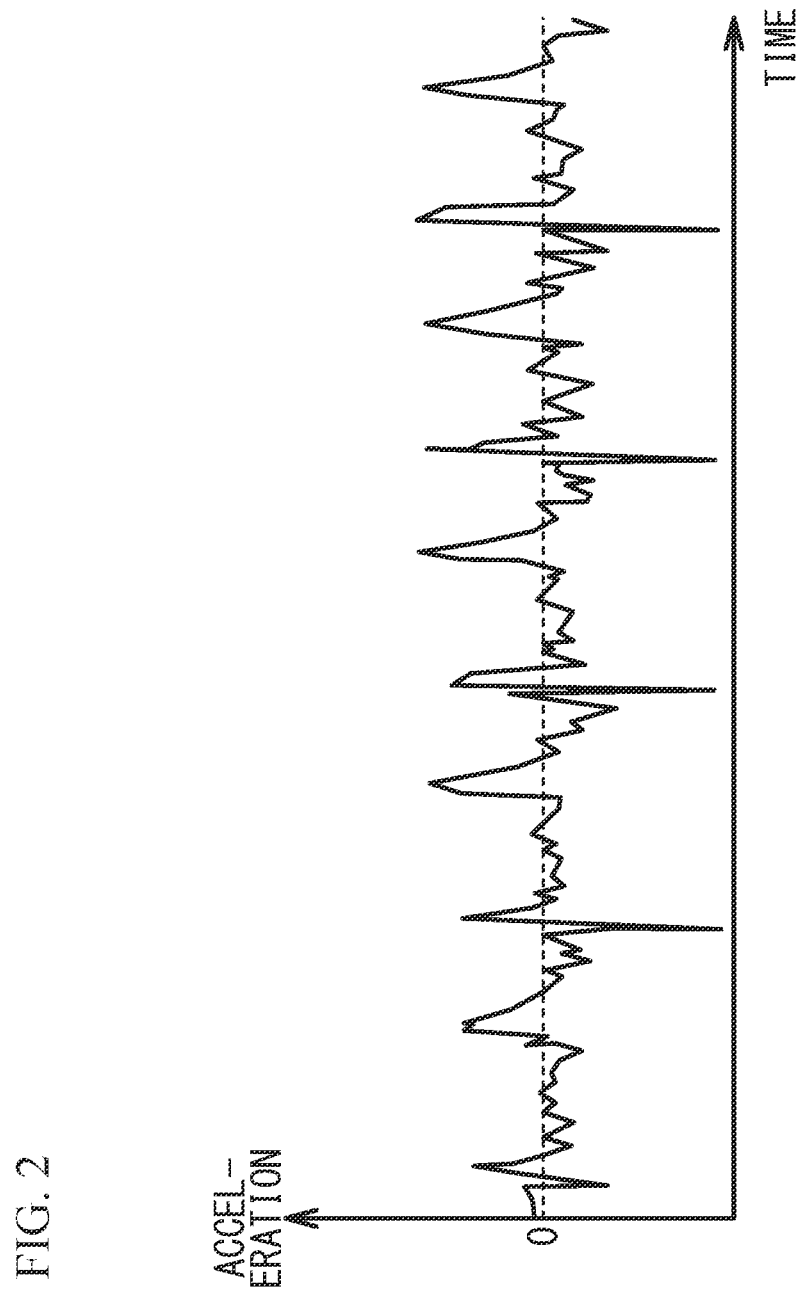
FIG. 2 schematically illustrates vibration applied to the vibration power generation device, and illustrates acceleration with respect to time.

FIG. 2 schematically illustrates vibration applied to the vibration power generation device, and illustrates acceleration with respect to time. FIG. 2 illustrates the vibration when a pedestrian walks. As illustrated in FIG. 2, accelerations with various periods and frequencies are applied to the vibration power generation device 14. Therefore, the electric power output from the vibration power generation device 14 varies from moment to moment.

In FIG. 1, the vibration power generation device 14 includes, for example, a vibrator that vibrates by environmental vibration and a power generation element that converts the vibration of the vibrator into electric power. The power generation element is, for example, an inorganic piezoelectric element using an inorganic piezoelectric material such as lead zirconate titanate (PZT), an organic piezoelectric element using an organic piezoelectric material such as polyvinylidene fluoride (PVDF), or a micro electro mechanical systems (MEMS) element using MEMS. Compared with the MEMS element, the impedances Zo of the inorganic piezoelectric element and the organic piezoelectric element have large capacitance components Co, and $Zo \approx 1/i\omega Co$. The Co of the inorganic piezoelectric element and the Co of the organic piezoelectric element are about 100 nF and about 1 nF, respectively. Here, $\omega/2\pi$ is the frequency of the output current of the piezoelectric element, and typical $\omega/2\pi$ of the inorganic piezoelectric element is about 100 Hz, and is, for example, 10 Hz to 1 kHz. Typical $\omega/2\pi$ of the organic piezoelectric element is about 10 Hz, and is, for example, 1 Hz to 100 Hz. Even when the frequency of the vibration in FIG. 2 is the same, $\omega$ is different between the organic piezoelectric element and the inorganic piezoelectric element because of the difference in resonance frequency or the like of the vibrator. On the other hand, since the output impedance of the MEMS element has a small capacitance component of 10 pF to 100 pF, the resistance component Ro is dominant, and Zo≈Ro. The typical value of Ro of the MEMS element is about 1 MΩ. Typical $\omega/2\pi$ of the MEMS element is about 100 Hz.

In a vibration power generation device with a large Co such as an inorganic piezoelectric element, the voltage V1 is relatively easily stabilized even when the primary capacitor C01 is not provided. However, in a vibration power generation device with a small Co such as an organic piezoelectric element and a MEMS element, or a vibration power generation device with a negligibly small Co such as a MEMS element, the voltage V1 is stabilized by providing the primary capacitor C01. The input impedance Zin of the voltage conversion circuit 10 is expressed by Expression 1.

$$Zin=(Iin/V1+i\times\omega\times C1)^{-1} \quad \text{(Expression 1)}$$

Here, $\omega$ is the angular frequency of the variation of the input current Iin. For example, $\omega$ corresponds to the angular frequency component of the vibration of the vibrator that vibrates in response to the acceleration in FIG. 2. Here, i is an imaginary unit. C1 is the capacitance of the capacitor C01. When the output impedance Zout via the rectifier circuit 12 of the vibration power generation device 14 is matched with the input impedance Zin of the voltage conversion circuit 10 having the primary capacitor C01, it is important to consider the capacitance C1 of the capacitor C01.

Figure 3A:
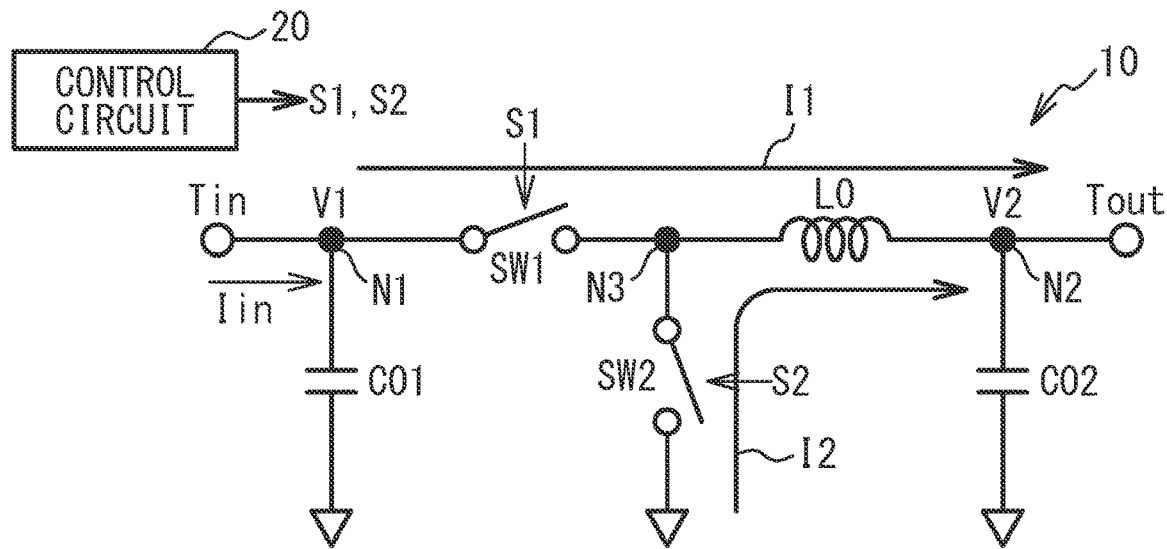
FIG. 3A to FIG. 3C are circuit diagrams illustrating examples of the power conversion circuit used in the first embodiment.
Figure 3B:
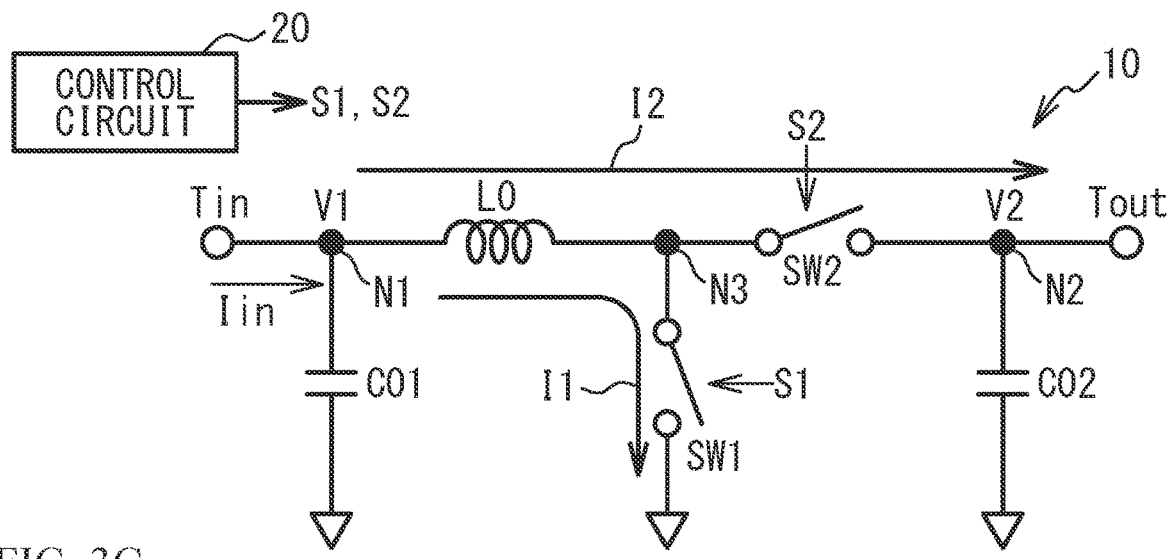
Figure 3C:
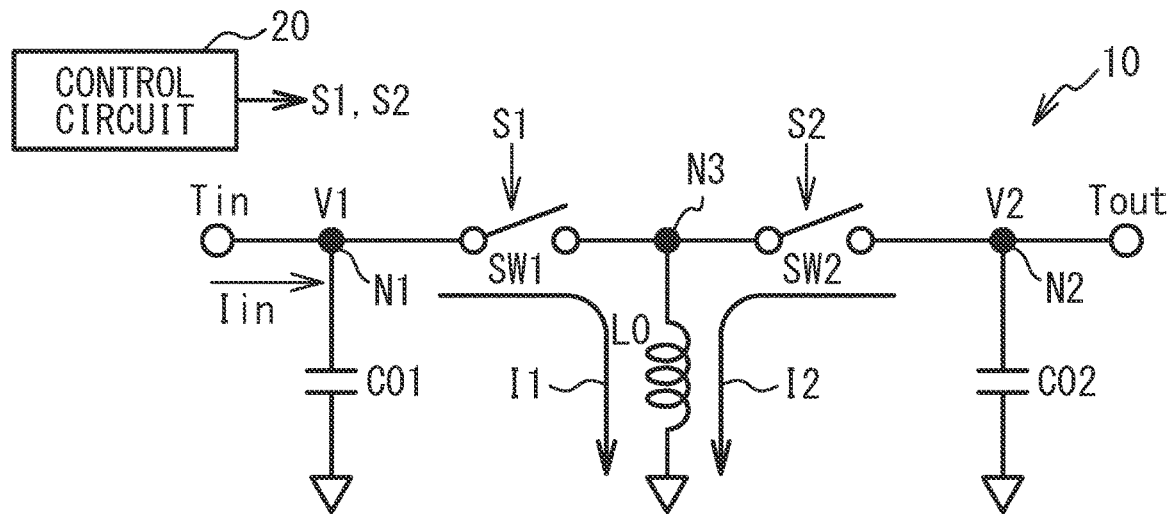

FIG. 3A to FIG. 3C are circuit diagrams illustrating the power conversion circuit used in the first embodiment. FIG. 3A is a circuit diagram of a step-down DC-DC converter, FIG. 3B is a circuit diagram of a step-up DC-DC converter, and FIG. 3C is a circuit diagram of an inversion-type DC-DC converter.

As illustrated in FIG. 3A to FIG. 3C, the power conversion circuit includes the voltage conversion circuit 10 and the control circuit 20. In any of the DC-DC converters, in the voltage conversion circuit 10, nodes N1 to N3 are provided between the input terminal Tin and the output terminal Tout. One end of the capacitor C01 is coupled to the node N1, and the other end is coupled to a ground (reference potential). One end of the capacitor C02 is coupled to the node N2, and the other end is coupled to a ground (reference potential). The control circuit 20 outputs control signals S1 and S2 to switching elements SW1 and SW2, respectively. For example, when the control signals S1 and S2 are at high level, the switching elements SW1 and SW2 are turned on, and when the control signals S1 and S2 are at low level, the switching elements SW1 and SW2 are turned off. The control circuit 20 may be a dedicated logic circuit or a processor operated by software.

As illustrated in FIG. 3A, in the step-down DC-DC converter, one end of an inductor L0 is coupled to the node N3, and the other end is coupled to the node N2. One end of the switching element SW1 is coupled to the node N1 and the other end is coupled to the node N3. One end of the switching element SW2 is coupled to the node N3, and the other end is coupled to a ground. The voltage V2 is lower than the voltage V1. When the switching elements SW1 and SW2 are turned on and off, respectively, part of the electric charge stored in the capacitor C01 flows through the inductor L0 as a current I1 and reaches the node N2. Thus, magnetic field energy is stored in the inductor L0. Subsequently, the switching elements SW1 and SW2 are turned off and on, respectively. This causes a current I2 to flow from the ground to the inductor L0 because of the magnetic field energy stored in the inductor L0 and reach the node N2. By these operations, the voltage V2 is maintained at a desired value.

As illustrated in FIG. 3B, in the step-up DC-DC converter, one end of the inductor L0 is coupled to the node N1, and the other end is coupled to the node N3. One end of the switching element SW1 is coupled to the node N3, and the other end is coupled to the ground. One end of the switching element SW2 is coupled to the node N3, and the other end is coupled to the node N2. The voltage V2 is higher than the voltage V1. When the switching elements SW1 and SW2 are turned on and off, respectively, part of the electric charge stored in the capacitor C01 flows through the inductor L0 as the current I1 and reaches the ground. When the switching elements SW1 and SW2 are turned off and on, respectively, the current I2 flows from the node N1 through the inductor L0 to the node N2 because of the magnetic field energy stored in the inductor L0. By these operations, the voltage V2 is maintained at a desired value.

As illustrated in FIG. 3C, in the inversion-type DC-DC converter, one end of the inductor L0 is coupled to the node N3, and the other end is coupled to the ground. One end of the switching element SW1 is coupled to the node N1 and the other end is coupled to the node N3. One end of the switching element SW2 is coupled to the node N3, and the other end is coupled to the node N2. The voltage V2 is a voltage that is opposite in sign to the voltage V1. When the switching elements SW1 and SW2 are turned on and off, respectively, part of the electric charge stored in the capacitor C01 flows through the inductor L0 as the current I1 and reaches the ground. When the switching elements SW1 and SW2 are turned off and on, respectively, the current I2 flows from the node N2 through the inductor L0 to the ground because of the magnetic field energy stored in the inductor L0. By these operations, the voltage V2 is maintained at a desired value. In FIG. 3A to FIG. 3C, at least a part of the input current Iin may be added to the current I1 in addition to the current output from the capacitor C01.

Figure 4:
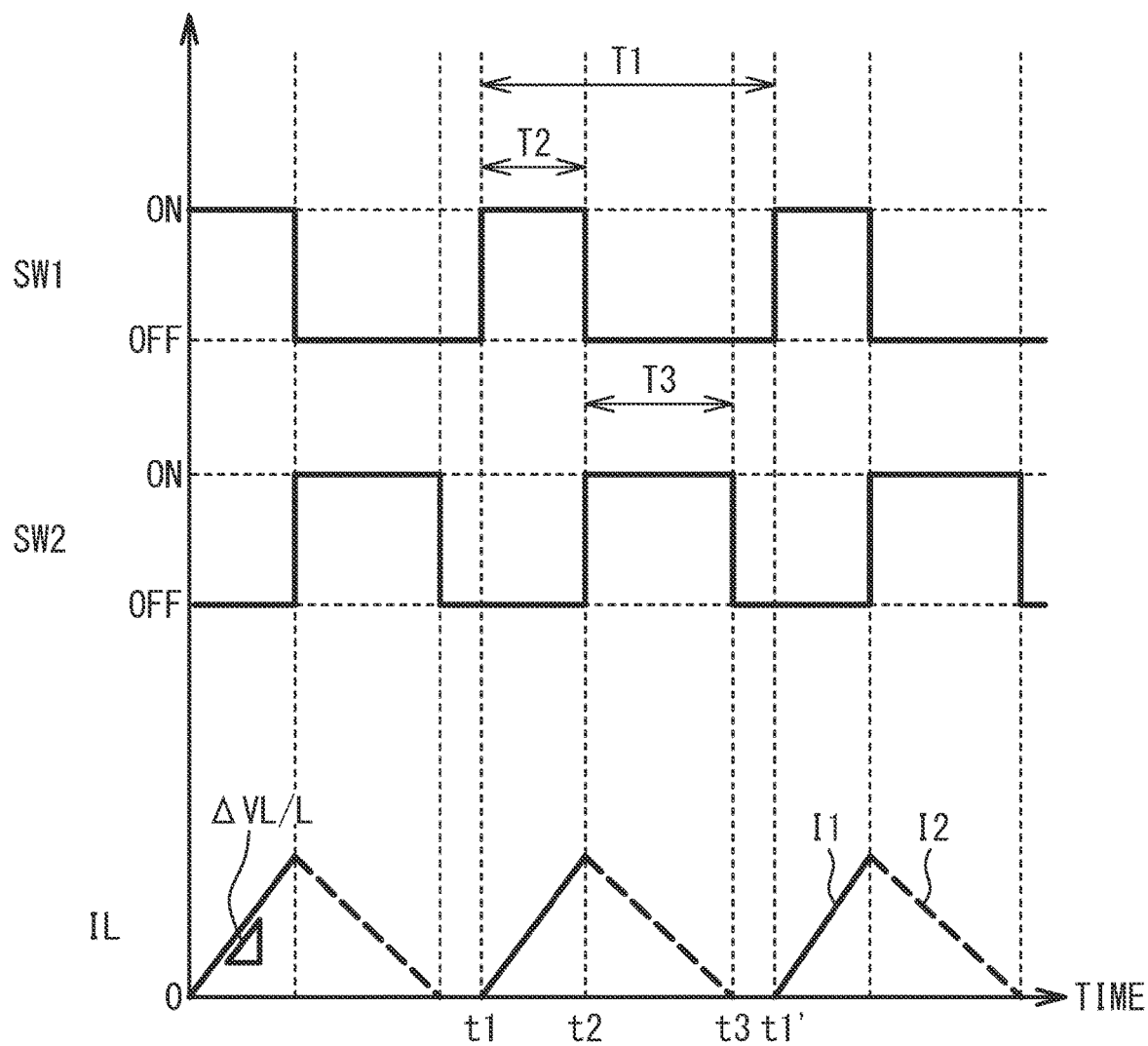
FIG. 4 illustrates ON and OFF of switching elements and a current IL flowing through an inductor with respect to time in the first embodiment.

FIG. 4 illustrates ON and OFF of the switching elements and a current IL flowing through the inductor with respect to time in the first embodiment. As the current IL flowing through the inductor L0, the current I1 is indicated by a solid line, and the current I2 is indicated by a broken line.

As illustrated in FIG. 4, at a point in time before time t1, the control circuit 20 performs the control such that the switching elements SW1 and SW2 are turned off. At time t1 when the current IL is 0, the control circuit 20 performs the control such that the switching element SW1 is turned on and the switching element SW2 is kept OFF. The current IL increases between time t1 and time t2. The increase rate of the current IL is $\Delta VL/L$. Here, $\Delta VL$ is the voltage difference between both ends of the inductor L0. In the step-down DC-DC converter illustrated in FIG. 3A, $\Delta VL=V1-V2$. In the step-up DC-DC converter illustrated in FIG. 3B, $\Delta VL=V1-0=V1$. In the inversion-type DC-DC converter illustrated in FIG. 3C, $\Delta VL=V1-0=V1$. Magnetic field energy is stored in the inductor L0.

At time t2, the control circuit 20 performs the control such that the switching element SW1 is turned off and the switching element SW2 is turned on. Note that the timing at which the switching element SW1 is turned off may be slightly different from the timing at which the switching element SW2 is turned on. The magnetic field energy stored in the inductor L0 is converted into the current IL, and the current I2 flows. The current I2 decreases with time. At time t3, when the current I2 becomes 0, the control circuit 20 performs the control such that the switching element SW2 is turned off and the switching element SW1 is kept OFF. After time t1', the same operation as that after time t1 is repeated. A cycle of turning on and off the switching elements SW1 and SW2 is represented by T1 (switching cycle), the length of the period during which the switching element SW1 is ON is represented by T2, and the length of the period during which the switching element SW2 is ON is represented by T3.

[Impedance Matching]

The output impedance Zout when the vibration power generation device 14 is viewed from the input terminal Tin of the voltage conversion circuit 10 via the rectifier circuit 12 (that is, the combined impedance of the rectifier circuit 12 and the vibration power generation device 14) is adjusted so as to be substantially a resistance component. Therefore, the resistance component Re(Zin) of the input impedance Zin of the voltage conversion circuit 10 is matched with the output impedance Zout of the vibration power generation device 14, and the reactance component Im(Zin) of the input impedance Zin of the voltage conversion circuit 10 is adjusted to be smaller than the resistance component Re(Zin). This configuration allows the input impedance Zin of the voltage conversion circuit 10 to be matched with the output impedance Zout of the vibration power generation device 14.

When it is assumed that C1 is sufficiently small in the input impedance Zin of Expression 1, Zin=V1/Iin. In the step-down and inversion-type DC-DC converters of FIG. 3A and FIG. 3C, the input current Iin is the average value of the current I1. In the step-up DC-DC converter illustrated in FIG. 3B, the input current Iin is the average value of the currents I1 and I2. Here, the input current Iin is assumed to be the average value of the current I1. In this case, when it is assumed that the slope of the current I1 with respect to time is substantially uniform, the input current Iin is a value obtained by multiplying the average current of the current I1 in the period T2 by T2/T1. When it is assumed that the current I1 at time t2 is I1(t2), the average current of the current I1 in the period T2 is ½×I1(t2). Accordingly, the input current Iin is expressed by Expression 2.

$$Iin=½×I1(t2)×T2/T1 \quad \text{(Expression 2)}$$

Here, when it is assumed that the inductance of the inductor L0 is L, I1(t2)=T2×ΔVL/L. Therefore, the input current Iin of Expression 2 becomes Expression 3.

$$Iin=(T2^2×\Delta VL)/(2×L×T1) \quad \text{(Expression 3)}$$

When ω×C1 of the input impedance Zin of Expression 1 is sufficiently smaller than Iin/V1, the input impedance Zin is expressed by Expression 4.

$$Zin=V1/Iin=(2×L×T1)/T2^2×V1/\Delta VL \quad \text{(Expression 4)}$$

In the step-down DC-DC converter of FIG. 3A, it is assumed that the voltage V2 is much smaller than the voltage V1. In the step-up and inversion-type DC-DC converters of FIG. 3B and FIG. 3C, ΔVL=V1. In these cases, the input impedance Zin of Expression 4 becomes Expression 5.

$$Zin=V1/Iin=(2×L×T1)/T2^2 \quad \text{(Expression 5)}$$

In Expressions 4 and 5, the input impedance Zin does not depend on the input current Iin. The cycle T1, the period T2, and the inductance L of the inductor L0 are appropriately set so that the input impedance Zin represented by Expression 4 or Expression 5 is substantially equal to the output impedance Zout of the vibration power generation device 14.

In other words, when the input impedance Zin is expressed by Expression 5, the values of the inductance L of the inductor L0, the cycle T1, and the period T2 are set so that the output impedance Zout is expressed by Expression 6.

$$Zout=(2×L×T1)/T2^2 \quad \text{(Expression 6)}$$

The value of the inductance L of the inductor L0 is set at the time of design, and the values of the cycle T1 and the period T2 are reflected in parameters for controlling the ON/OFF timing of the switching elements SW1 and SW2 by the control circuit 20. Thus, the input impedance Zin of the voltage conversion circuit 10 can be matched with the output impedance Zout of the vibration power generation device 14 regardless of the magnitude of the input current Iin.

To match the input impedance Zin with the output impedance Zout, the inductance L, the cycle T1, and the period T2 are preferably set in a range of $0.3×((2×L×T1)/T2^2) \leq Zout \leq 3×((2×L×T1)/T2^2)$, and more preferably set in a range of $0.5×((2×L×T1)/T2^2) \leq Zout \leq 1.5×((2×L×T1)/T2^2)$. Thus, the input impedance Zin is matched with the output impedance Zout, and the power conversion efficiency is improved.

When the input current Iin is adjusted to be the average value of the currents I1 and I2 in the step-up DC-DC converter of FIG. 3B, and when ΔVL is adjusted to be equal to V1−V2 in the step-down DC-DC converter of FIG. 3A, the input impedance Zin can be set so as not to depend on the input current Iin. Therefore, by appropriately setting each value, it is possible to autonomously match the input impedance Zin of the voltage conversion circuit 10 with the output impedance Zout of the vibration power generation device 14. In the case of the step-up DC-DC converter illustrated in FIG. 3B, the period T3 is adjusted to be substantially constant in addition to the period T2.

[Upper Limit of C1]

In Expression 1, when ω×C1 is larger than Iin/V1, ω×C1 interferes with impedance matching even when the input impedance Zin of Expressions 4 and 5 is matched with the output impedance Zout. Therefore, Iin/V1 is preferably sufficiently larger than ω×C1. That is, Expression 7 is preferably satisfied.

$$1/(\omega×C1)>>V1/Iin \quad \text{(Expression 7)}$$

From Expressions 5 and 7, Expression 8 is preferably satisfied.

$$C1<<(T2^2/(2×L))/(\omega×T1) \quad \text{(Expression 8)}$$

From Expression 8, $C1<(T2^2/(2×L))/(\omega×T1)$ is preferable, $C1<(T2^2/(2×L))/(\omega×T1)/5$ is more preferable, and $C1<(T2^2/(2×L))/(\omega×T1)/10$ is further preferable. These configurations facilitate impedance matching between the output impedance Zout of the vibration power generation device 14 and the input impedance Zin of the voltage conversion circuit 10.

[Lower Limit of C1]

In the case that the capacitance C1 of the capacitor C01 is small, the voltage V1 tends to vary. When the amount of electric charge discharged from the capacitor C01 is represented by Q1, the amount of variation in the voltage V1 is $\Delta V1=Q1/C1$. The charge amount Q1 is an electric charge corresponding to the current I1 in the step-down DC-DC converter of FIG. 3A and the inversion-type DC-DC converter of FIG. 3C, and is an electric charge corresponding to the currents I1 and I2 in the step-up DC-DC converter of FIG. 3B. When it is assumed that the charge amount Q1 is an electric charge corresponding to the current I1, the variation amount $\Delta V1$ of the voltage V1 is obtained by Expression 9.

$$\Delta V1=Q1/C1=\tfrac{1}{2}\times I1(t2)\times T2/C1 \quad \text{(Expression 9)}$$

The variation amount $\Delta V1$ of the voltage V1 is preferably sufficiently smaller than the voltage V1. Therefore, when $\Delta V1 \ll V1$ is satisfied and $I1(t2)=T2\times\Delta VL/L$ is substituted into Expression 9, Expression 10 is obtained.

$$T2^2\times\Delta VL/(2\times L\times 1)\ll V1 \quad \text{(Expression 10)}$$

When it is assumed that $\Delta VL=V1$, the preferred range of the capacitance C1 is given by Expression 11.

$$C1\gg T2^2/(2\times L) \quad \text{(Expression 11)}$$

From Expression 11, $C1>T2^2/(2\times L)$ is preferable, $C1>5\times T2^2/(2\times L)$ is more preferable, and $C1>10\times T2^2/(2\times L)$ is further preferable. These configurations can reduce the variation in the voltage V1.

Setting examples of the cycle T1, the period T2, the inductance L, and the capacitance C1 will be described. From Expressions 8 and 11, $T1\ll 1/\omega$). When $\omega=2\pi\times 50$ Hz, T1 is preferably 300 µs or less. A fraction of T1 is appropriate to T2, and, for example, 100 µs is set. L and C1 are only required to satisfy $T2^2/2\ll L\times C1$ $T2^2/(2\times T1\times\omega)$ from Expressions 8 and 11. For example, when L=100 mH, C1=150 nF is preferable.

First Variation of First Embodiment

Figure 5:
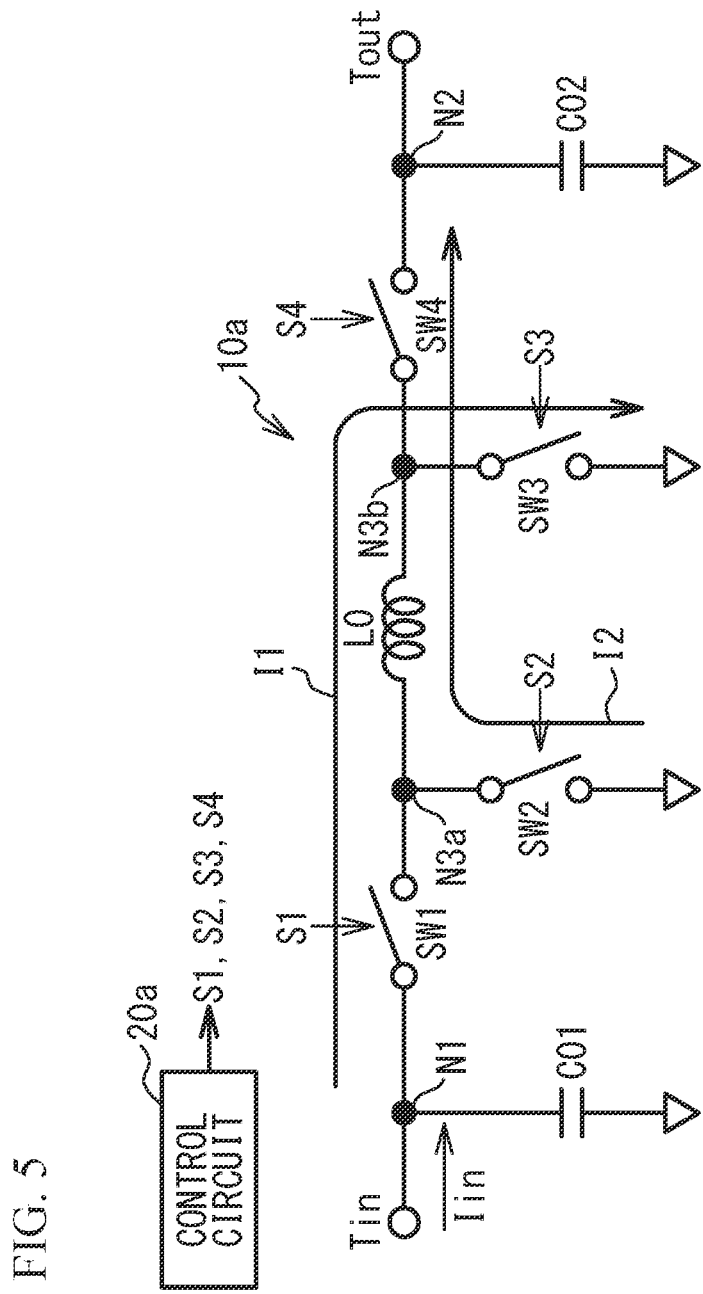
FIG. 5 is a circuit diagram of the power conversion circuit in accordance with a first variation of the first embodiment.

A first variation of the first embodiment is an example of a step-up/step-down DC-DC converter. FIG. 5 is a circuit diagram of a power conversion circuit in accordance with the first variation of the first embodiment. As illustrated in FIG. 5, the power conversion circuit of the first variation of the first embodiment includes a voltage conversion circuit 10a and a control circuit 20a. One end of the switching element SW1 is coupled to the node N1 and the other end is coupled to a node N3a. One end of the inductor L0 is coupled to the node N3a, and the other end is coupled to a node N3b. One end of a switching element SW4 is coupled to the node N3b, and the other end is coupled to the node N2. One end of the switching element SW2 is coupled to the node N3a, and the other end is grounded. One end of a switching element SW3 is coupled to the node N3b, and the other end is grounded. The control circuit 20a outputs control signals S1 to S4 for turning on and off the switching elements SW1 to SW4, respectively. Other circuit configurations are the same as those in FIG. 3A to FIG. 3C of the first embodiment, and a description thereof will be omitted.

Figure 6:
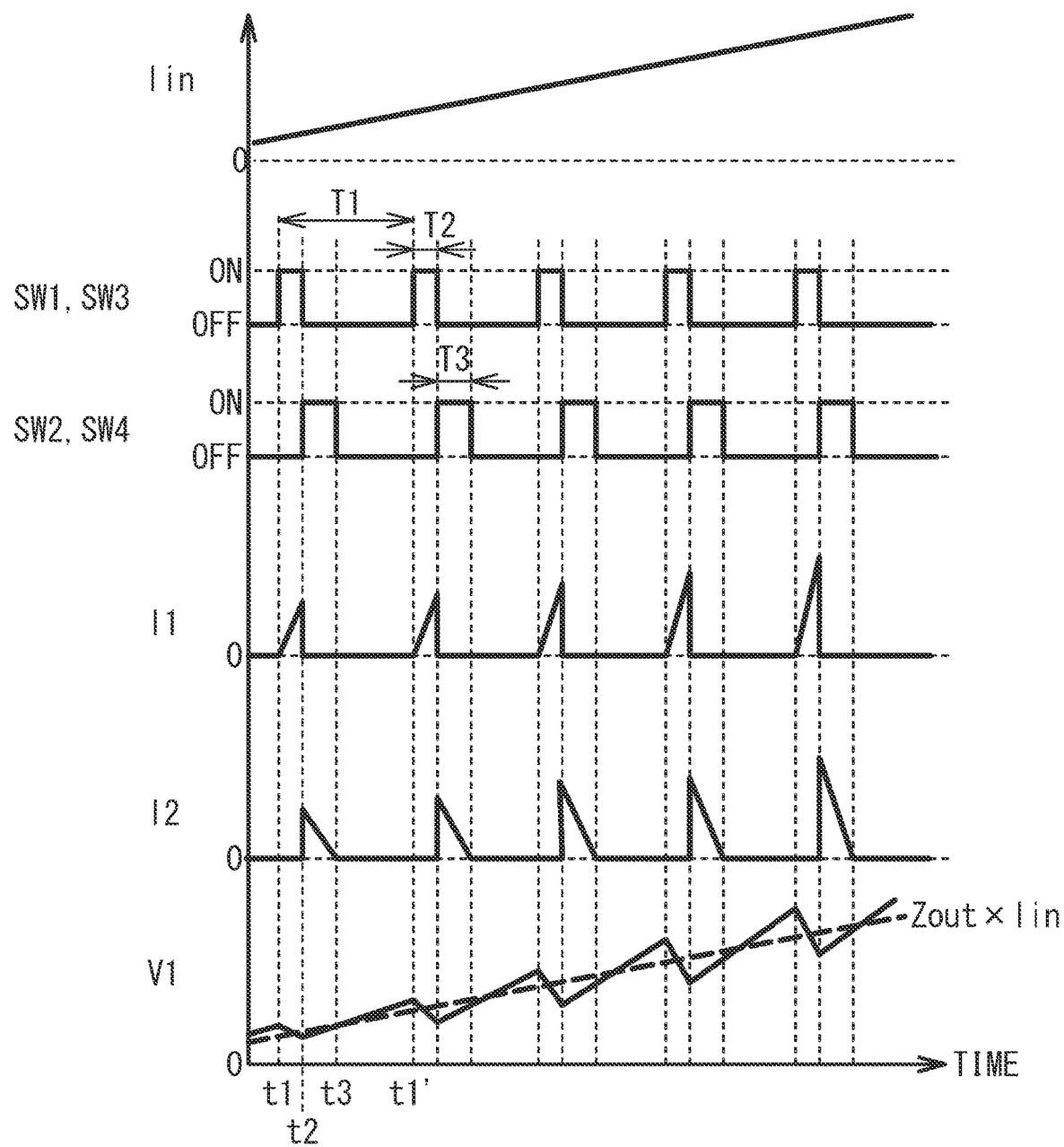
FIG. 6 illustrates ON and OFF of the switching elements, currents, and a voltage with respect to time in the first variation of the first embodiment.

FIG. 6 illustrates ON and OFF of the switching elements, currents, and a voltage with respect to time in the first variation of the first embodiment. In the power generation system of FIG. 1, the input current Iin varies from moment to moment, but in FIG. 6, an example in which the input current Iin increases at a constant rate will be described. As illustrated in FIG. 6, the control circuit 20a performs the control such that the switching elements SW1 to SW4 are OFF until time t1. The currents I1 and I2 are 0. Since the input current Iin charges the capacitor C0L the voltage V1 gradually increases. At time t1, the control circuit 20a performs the control such that the switching elements SW1 and SW3 are turned on and the switching elements SW2 and SW4 are kept OFF. Between time t1 and time t2, the current I1 gradually increases. Since the capacitor C01 is discharged, the voltage V1 gradually decreases.

At time t2, the control circuit 20a performs the control such that the switching elements SW1 and SW3 are turned off and the switching elements SW2 and SW4 are turned on. The magnitude of the current I1 immediately before time t2 and the magnitude of the current I2 immediately after time t2 are substantially the same. Between time t2 and time t3, the current I1 does not flow, and the current I2 gradually decreases. Since the input current Iin charges the capacitor C0L the voltage V1 gradually increases. At time t3, the control circuit 20a performs the control such that the switching elements SW2 and SW4 are turned off and the switching elements SW1 and SW3 are kept OFF. The currents I1 and I2 do not flow between time t3 and time t1', and the voltage V1 gradually increases. Thereafter, at time t1', the switching elements SW1 and SW3 are turned on.

The switching cycle T1, the period T2 during which the switching elements SW1 and SW3 are ON, and the period T3 during which the switching elements SW2 and SW4 are ON are each substantially constant. As the input current Iin increases, the peaks of the currents I1 and I2 increase. The voltage V1 gradually increases while repeating up and down. The average of the voltage V1 in each cycle T1 is substantially the same as the broken line of Zout×Iin of each cycle T1. That is, Zin=V1/Vin is substantially the same as Zout. As is clear from the above, even when the input current Iin varies, the input impedance Zin can be matched with the output impedance Zout of the vibration power generation device 14. Therefore, the power conversion efficiency is improved.

In the first embodiment and the variation thereof, as illustrated in FIG. 3A to FIG. 3C, one end of the inductor L0 is coupled to one end of the capacitor C01 (a first capacitor), and the other end is coupled to one end of the capacitor C02 (a second capacitor) at the node N2 side or the other end of the capacitor C02 at the ground side. Since at least part of the input current Iin and the current output from the capacitor C01 flows through the inductor L0 as the current I1 (a first current), magnetic field energy is stored in the inductor L0. The capacitor C02 is charged by the current I2 (a second current) induced by the magnetic field energy. The switching elements SW1 and SW2 are turned on and off at a substantially constant cycle T1, and the period T2 during which the switching elements SW1 and SW2 are ON in one cycle is substantially constant. When the switching element SW1 (the switching elements SW1 and SW3 in the first variation of the first embodiment) is turned on, the current I1 flows through the inductor L0, and when the current I2 flows through the inductor L0, the switching element SW1 (the switching elements SW1 and SW3 in the first variation of the first embodiment) is OFF. Thus, even when the input current Iin varies, the input impedance Zin can be made constant. Therefore, the power conversion efficiency can be improved. Note that the statement "the cycle T1, the period T2, and the period T3 are substantially constant" allows a variation of about ±20% or about ±10%.

When the capacitance C1 of the capacitor C01 is large, Zin in Expression 1 deviates from V1/Iin, and it becomes difficult to match the input impedance Zin with the output impedance Zout of the vibration power generation device 14. Therefore, from Expression 8, configurations such that $C1<(T2^2/(2\times L))/(\omega\times T1)$ is satisfied are set. This enables autonomous impedance matching. In the vibration power generation device 14, as illustrated in FIG. 2, since vibration energy is extracted by the vibrator from environmental vibrations of various cycles to generate power, the angular frequency of the input current Iin is equal to the angular frequency of the vibrator. In the case that the vibrator is a harmonic vibrator, its resonance frequency can be adjusted to be ω. In the case of an anharmonic vibrator, the angular frequency corresponding to the largest peak in the spectrum obtained by Fourier series expansion of the input current Iin is preferably adjusted to be ω. Note that C1>0.

As described above, ω is an angular frequency corresponding to the vibration frequency of the vibration power generation device 14. For example, when the vibration power generation device 14 has a resonance frequency, ω is preferably adjusted to be an angular frequency corresponding to the resonance frequency of the vibration power generation device 14. When there are a plurality of resonance frequencies, it is preferable to set the angular frequency corresponding to the resonance frequency at which the input current Iin is largest as ω. In the case of an anharmonic vibrator, the angular frequency corresponding to the largest peak in the spectrum obtained by Fourier series expansion of the input current Iin is set as ω. In the case of using an anharmonic vibrator, for this purpose, the anharmonic vibrator is vibrated in advance, the input current Iin is measured, and the angular frequency corresponding to the largest peak obtained from the result of Fourier series expansion is set as ω.

Further, when the variation of the voltage V1 becomes large, it becomes difficult to keep the input impedance Zin constant. Therefore, from Expression 11, configurations are set so that $C1 > T2^2/(2 \times L)$ is satisfied. This configuration can reduce the variation in the voltage V1.

Although an example in which the current generated by the vibration power generation device 14 is input to the input terminal Tin as the input current Iin has been described, the voltage conversion circuit 10 or 10a may be used for power conversion of an energy harvesting device such as a solar battery or a wind power generator. When direct current power is generated as in the case of a solar cell, the rectifier circuit 12 can be omitted. The amount of power generated by the energy harvesting device is likely to vary, and the input impedance of the voltage conversion circuit 10 or 10a is likely to vary. By using the voltage conversion circuit 10 or 10a of the first embodiment and the variation thereof for energy harvesting, the input impedance of the voltage conversion circuit 10 or 10a can be matched with the output impedance of the energy harvesting device. The voltage conversion circuit 10 or 10a of the first embodiment and the variation thereof may be used for other purposes.

When the capacitance of the vibration power generation device 14 is small as in an organic piezoelectric element or a MEMS element, the primary capacitor C01 is provided to stabilize the voltage V1. Therefore, it is preferable to set the range of the capacitance C1 of the capacitor C01 to the range by Expression 7 and Expression 10. In this case, in the case that the vibration power generation device 14 outputs a direct current power, the output capacitance of the vibration power generation device 14 is smaller than the capacitance C1. In the case that the vibration power generation device 14 outputs an alternating current power, the output capacitance of the vibration power generation device 14 via the rectifier circuit is smaller than C1.

Second Embodiment

A second embodiment for solving the second problem will be described. In the power conversion circuits in accordance with the first embodiment and the variation thereof, the cycle T1 and the period T2 are set to be constant, and the inductance L and the capacitance C1 are set so as to satisfy Expression 8 and Expression 11. However, when the inductance L and the capacitance C1 are set so as to satisfy Expression 8 and Expression 11, the switching frequencies may become too high and the power consumption may increase. In the second embodiment below, the cycle T1 and the period T2 do not have to be constant. Further, it is not necessary to set the inductance L and the capacitance C1 so as to satisfy Expression 8 and Expression 11.

Figure 7:
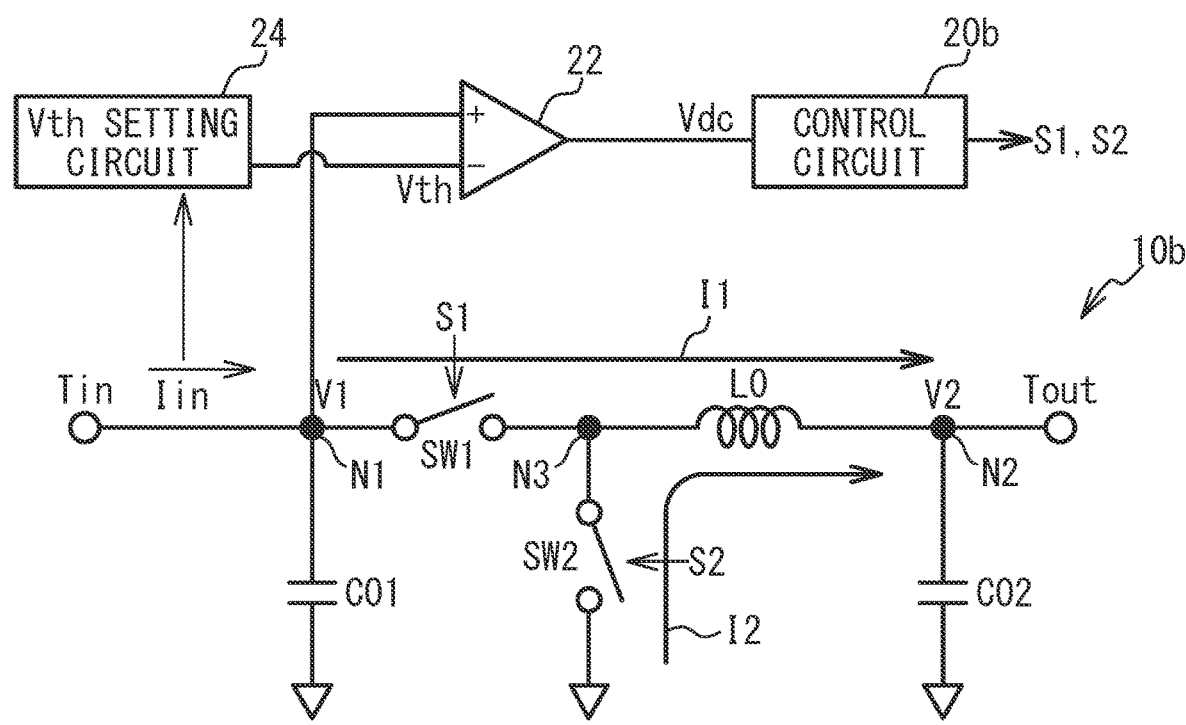
FIG. 7 is a circuit diagram of the power conversion circuit in accordance with the second embodiment.

The second embodiment is an example of a step-down DC-DC converter. FIG. 7 is a circuit diagram of a power conversion circuit in accordance with the second embodiment. As illustrated in FIG. 7, a comparator 22 outputs a high level as a voltage Vdc when the voltage V1 is equal to or higher than a threshold voltage Vth, and outputs a low level as the voltage Vdc when the voltage V1 is lower than the threshold voltage Vth. A Vth setting circuit 24 sets the threshold voltage Vth based on the value of the input current Iin detected by a current detection circuit described later with reference to FIG. 8. When the voltage Vdc becomes a high level, a control circuit 20b starts generating the control signals S1 and S2. This causes a voltage conversion circuit 10b to start the voltage conversion operation. Other circuit configurations are the same as those in FIG. 3A of the first embodiment, and the description thereof will be omitted.

Figure 8:
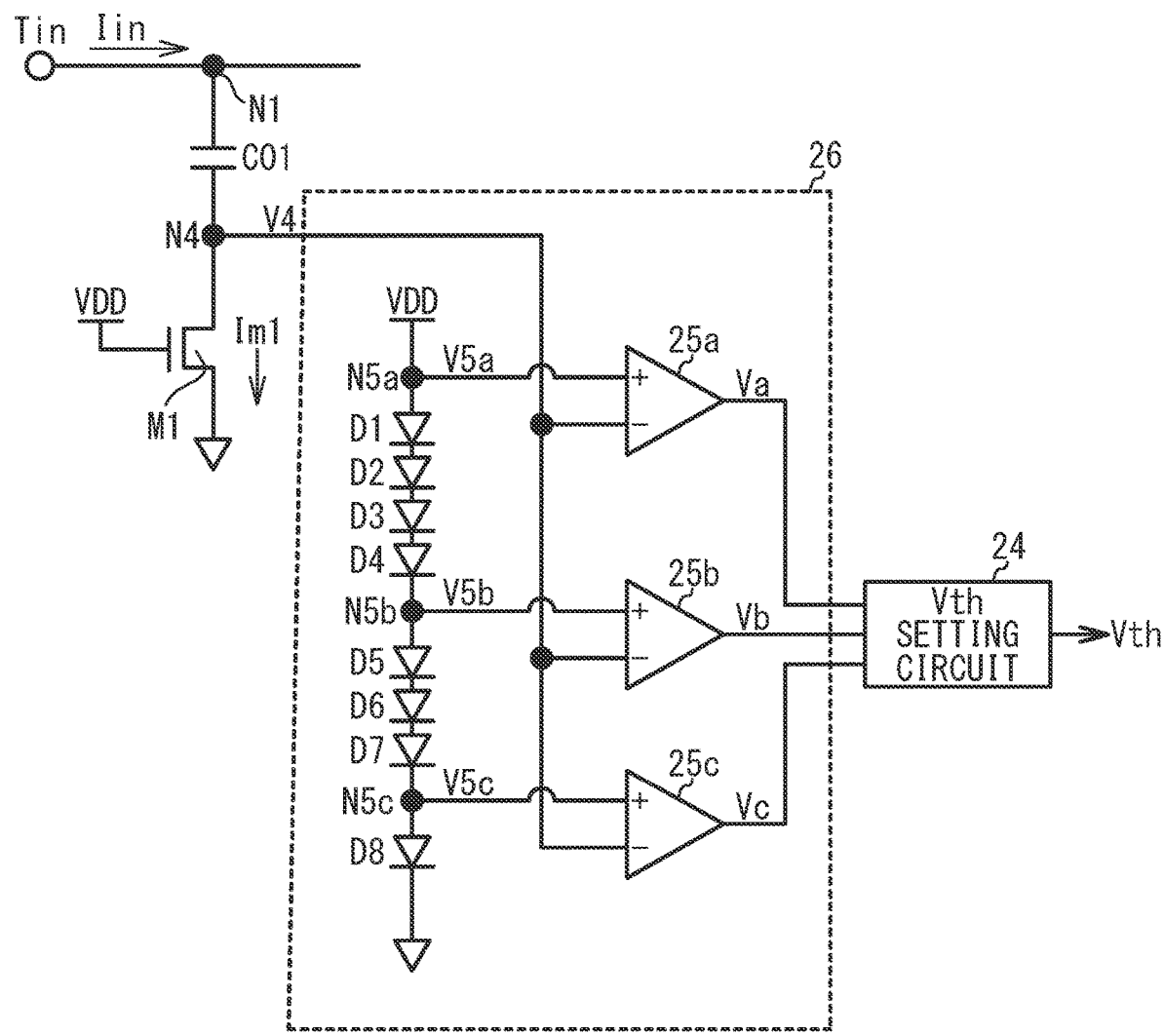
FIG. 8 is a circuit diagram illustrating a current detection circuit in accordance with the second embodiment.

FIG. 8 is a circuit diagram illustrating the current detection circuit in the second embodiment. As illustrated in FIG. 8, an NFET M1 is connected between the capacitor C01 and a ground. The source of the NFET M1 is coupled to a ground, the drain is coupled to a node N4, and the gate is supplied with, for example, 1V as a power supply voltage VDD. The NFET M1 functions as a shunt resistor. A current detection circuit 26 includes a plurality of diodes D1 to D8 and comparators 25a to 25c. The diodes D1 to D8 are connected in series in a forward direction between a power supply terminal, to which the power supply voltage VDD is supplied, and a ground. Nodes N5a to N5c are provided at predetermined locations between the power supply terminal and the ground. For example, the node N5a is located between the diode D1 and the power supply terminal, the node N5b is located between the diodes D4 and D5, and the node N5c is located between the diodes D7 and D8. Input terminals of the comparators 25a to 25c are coupled to the node N4 and the nodes N5a to N5c, respectively. Signals Va to Vc output from the comparators 25a to 25c are output to the Vth setting circuit 24.

When the input current Iin flowing from the input node Tin to the node N1 flows into the capacitor C01, a current Im1 flows from the capacitor C01 to the ground via the NFET M1 in order to balance the charge amount between the electrodes of the capacitor C01. If the current flowing from the capacitor C01 to the voltage conversion circuit is not taken into consideration, the current Im1 is substantially equal to the input current Iin. As the input current Iin increases, the potential V4 of the node N4 increases. The potential V5a of the node N5a is VDD, the potential V5b of the node N5b is ⅝×VDD, and the potential V5c of the node N5c is ⅛×VDD. The potentials V5a to V5c can be freely set according to the power supply voltage, the number of the diodes D1 to D8, and the positions of the nodes N5a to N5c. The comparators 25a to 25c compare the potential of the node N4 with the potentials of the nodes N5a to N5c, respectively. When the potential of the node N4 is higher than the potentials of the nodes N5a to N5c, the comparators 25a to 25c output high levels as the signals Va to Vc, respectively. When the potential of the node N4 is lower than the potentials of the nodes N5a to N5c, the comparators 25a to 25c output low levels as the signals Va to Vc, respectively.

When the input current Iin is small and the potential V4 is lower than the potential V5c, the signals Va to Vc are all at low level. In this case, the Vth setting circuit 24 sets the threshold voltage Vth at Vth1 that is the smallest. When the input current Iin increases and the potential V4 is between the potentials V5c and V5b, the signals Va and Vb are at low level and the signal Vc is at high level. In this case, the Vth setting circuit 24 sets the threshold voltage Vth at Vth2 higher than Vth1. When the input current Iin increases and the potential V4 is between the potentials V5b and V5a, the signal Va is at low level and the signals Vb and Vc are at high level. In this case, the Vth setting circuit 24 sets the threshold voltage Vth at Vth3 higher than Vth2. When the input current Iin increases and the potential V4 is higher than the potential V5a, the signals Va to Vc are all at high level. In this case, the Vth setting circuit 24 sets the threshold voltage Vth at Vth4 higher than Vth3.

By using the current detection circuit 26 of FIG. 8, the threshold voltage Vth can be set on the basis of the input current Iin. The number of the nodes N5a to N5c and the number of the comparators 25a to 25c can be freely set.

Figure 9:
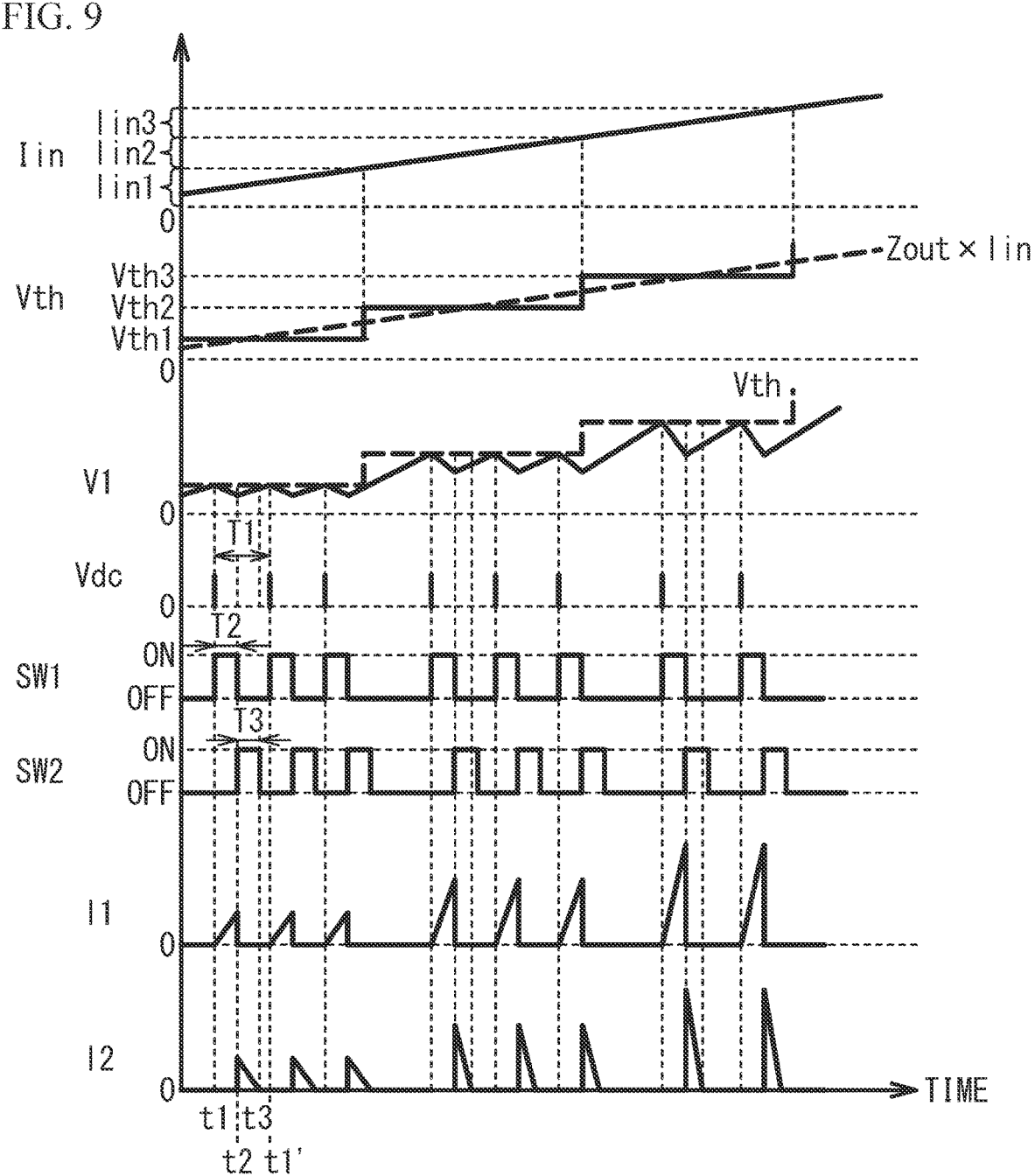
FIG. 9 illustrates ON and OFF of the switching elements, currents, and voltages with respect to time in the second embodiment.

FIG. 9 illustrates ON and OFF of the switching elements, currents, and voltages with respect to time in the second embodiment. An example in which the input current Iin increases at a constant rate as illustrated in FIG. 9 will be described. As the input current Iin increases, the Vth setting circuit 24 generates higher Vth to set a higher threshold voltage Vth. The Vth setting circuit 24 sets the threshold voltage Vth at Vth1 when the input current Iin is within the range of Iin1, sets the threshold voltage Vth at Vth2 when the input current Iin is within the range of Iin2, and sets the threshold voltage Vth at Vth3 when the input current Iin is within the range of Iin3. The threshold voltage Vth is set so as to be substantially Zout×Iin.

For example, when the input current Iin is within the range Iin1, Vth1≈Zout×Iin. Similarly, when the input current Iin is within the range Iin2, Vth2≈Zout×Iin, and when the input current Iin is within the range Iin3, Vth3≈Zout×Iin.

The Vth setting circuit 24 (a setting circuit) preferably sets the threshold voltage Vth so that 0.3×Zout≤Vth/Iin≤3×Zout is satisfied, and more preferably sets the threshold voltage Vth so that 0.5×Zout≤Vth/Iin≤1.5×Zout is satisfied. Thus, the input impedance Zin is matched with the output impedance Zout, and the power conversion efficiency is improved.

Until time t1, the control circuit 20b performs the control such that the switching elements SW1 and SW2 are OFF. The currents I1 and I2 are 0. Since the input current Iin charges the capacitor C01, the voltage V1 gradually increases. When the voltage V1 reaches the threshold voltage Vth at time t1, the voltage Vdc becomes a high level. The control circuit 20b performs the control such that the switching element SW1 is turned on and the switching element SW2 is kept OFF during the period T2 after the voltage Vdc becomes a high level. The current I1 gradually increases between time t1 and time t2. The voltage V1 gradually decreases.

At time t2, the control circuit 20b performs the control such that the switching element SW2 is turned on and the switching element SW1 is turned off. The current I1 becomes 0. Between time t2 and time t3, the current I2 gradually decreases and the voltage V1 gradually increases. At time t3, the control circuit 20b performs the control such that the switching element SW2 is turned off and the switching element SW1 is kept OFF. Between time t3 and time t1', the currents I1 and I2 are 0. The voltage V1 gradually increases. When the voltage V1 becomes equal to the threshold voltage Vth at time t1', the voltage Vdc becomes a high level.

When the input current Iin increases, the threshold voltage Vth becomes Vth2, which is larger than Vth1. When the input current Iin further increases, the threshold voltage Vth becomes Vth3, which is larger than Vth2. Thus, the voltage V1 increases as the input current Iin increases. By setting the threshold voltage Vth to be substantially equal to Zout×Iin, the voltage V1 becomes substantially equal to Zout×Iin. Thus, even when the input current Iin varies, the input impedance Zin=V1/Iin can be matched with the output impedance Zout of the vibration power generation device 14. Therefore, the power conversion efficiency can be improved.

In the second embodiment, when the input voltage V1 applied to the input terminal Tin reaches the threshold voltage Vth, the voltage conversion circuit 10b starts the voltage conversion operation of converting the input voltage V1 and outputting it to the output terminal Tout as the output voltage V2. The threshold voltage Vth when the input current Iin input to the input terminal Tin is large is higher than the threshold voltage Vth when the input current Iin is small. As described above, since the threshold voltage Vth is changed as the input current Iin varies, the variation in the input impedance Zin can be reduced even when the input current Iin varies. Therefore, the input impedance Zin can be matched with the output impedance Zout of the vibration power generation device 14. Therefore, the power conversion efficiency can be improved.

By setting the threshold voltage Vth so that 0.3×Zout≤Vth/Iin≤3×Zout is satisfied, the input impedance Zin can be matched with the output impedance Zout of the vibration power generation device 14. More preferably, 0.5×Zout≤Vth/Iin≤1.5×Zout is satisfied.

As illustrated in FIG. 9 of the second embodiment, the Vth setting circuit 24 sets the threshold voltage Vth on the basis of the input current Iin so that the threshold voltage Vth2 in the range of Iin2 where the input current Iin is large is higher than the threshold voltage Vth in the range of Iin1 where the input current Iin is small. The comparator 22 (a determination circuit) determines whether the input voltage V1 has reached the threshold voltage Vth. The voltage conversion circuit 10b starts the voltage conversion operation on the basis of the output of the comparator 22. Thus, the input impedance Zin can be matched with the output impedance Zout of the vibration power generation device 14. Therefore, the power conversion efficiency can be improved.

Although a step-down DC-DC converter has been described as an example of the second embodiment, a step-up DC-DC converter or an inversion-type DC-DC converter illustrated in FIG. 3B and FIG. 3C may be used. That is, in the voltage conversion circuit 10b, the inductor L0 has one end coupled to the input terminal Tin, and the other end coupled to one end or the other end of the capacitor C02 (a second capacitor). Magnetic field energy is stored in the inductor L0 by at least a part of the input current Iin flowing through the inductor L0 as the current I1 (a first current), and the capacitor C02 is charged by the current I2 (a second current) induced by the magnetic field energy. When the switching element SW1 is turned on, the current I1 flows through the inductor L0, and when the current I2 flows through the inductor L0, the switching element SW1 is OFF.

When the input voltage V1 reaches the threshold voltage Vth, the control circuit 20b turns on the switching element SW1. This starts the voltage conversion operation of the voltage conversion circuit 10b.

In the second embodiment, an example in which the Vth setting circuit 24 sets the threshold voltage Vth on the basis of the input current Iin has been described, but the Vth setting circuit 24 may set the threshold voltage Vth on the basis of information related to the input current Iin. For example, the amplitude information of the MEMS element correlates with the output current amount of the MEMS element. Therefore, the Vth setting circuit 24 may set the threshold voltage Vth on the basis of the amplitude information of the MEMS element. For example, the MEMS element may include a main MEMS vibrator that outputs power as an input current of the power conversion circuit and a sensing MEMS vibrator having an amplitude substantially equal to the amplitude of the main MEMS vibrator, and the output current of the sensing MEMS vibrator may be converted into a voltage signal by a shunt resistor or the like to be used as the amplitude information.

In the first embodiment and the first variation thereof, the capacitance C1 of the capacitor C01 is limited. The second embodiment can be used without limiting the capacitance C1. In addition, in the second embodiment, since impedance matching is actively performed, impedance matching is easier than in the first embodiment and the first variation thereof and power conversion efficiency is easily improved. On the other hand, in the second embodiment, since the comparator 22 is used, the power consumption is large, and in the case that the generated power of the vibration power generation device 14 is small (for example, in the case that generated power is 100 nW or less), application may be difficult. In the first embodiment and the first variation thereof, since the comparator 22 does not have to be used, the power consumption is small, and it is easy to apply the first embodiment and the first variation thereof to a case in which the generated power of the vibration power generation device 14 is small (for example, the case in which the generated power is 100 nW or less).

In the first and second embodiments and the variations thereof, the vibration power generation device 14 has been described as an example of the power supply, but the power supply may be other power generation devices or the like. The power conversion circuit in accordance with the first and second embodiments and the variations thereof may be a single-ended primary inductor converter (SEPIC), a ZETA circuit, a Cuk circuit, a step-up chopper circuit, or a step-down chopper circuit.

In the first and second embodiments and the variations thereof, the switching elements SW1 to SW4 are transistors such as field effect transistors (FETs), insulated gate bipolar transistors (IGBTs), or bipolar transistors. The control signals S1 to S4 are input to a gate or a base. The control signals S1 to S4 turn on and off the switching elements SW1 to SW4 between the source and the drain or between the emitter and the collector. The switching elements SW2 and SW4 may be diodes.

Third Embodiment

Figure 10A:
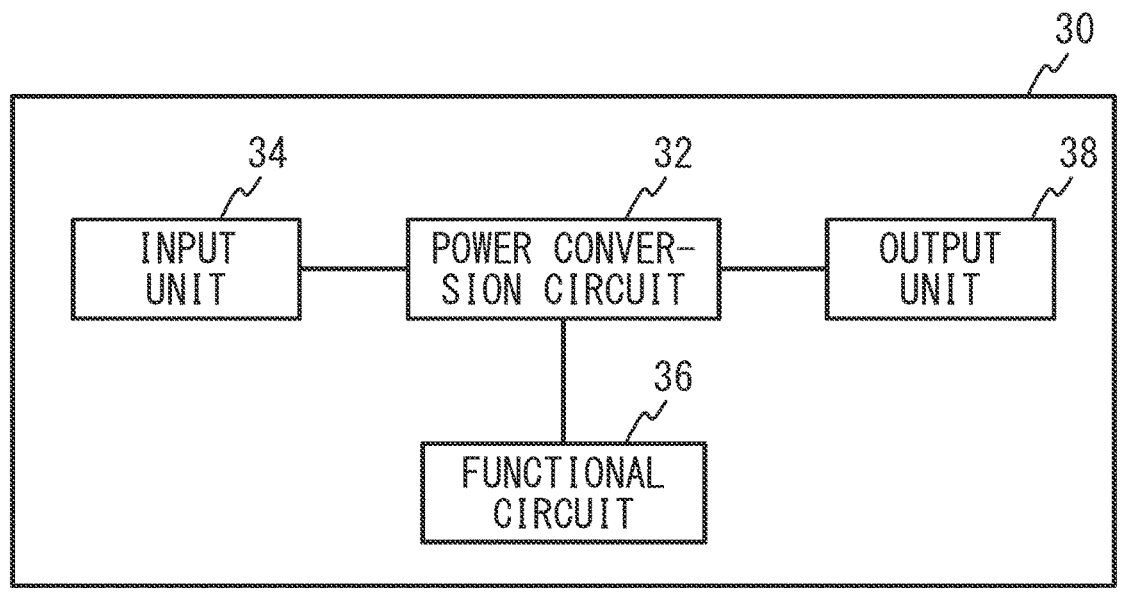
FIG. 10A is a block diagram of a semiconductor device in accordance with a third embodiment.

A third embodiment is an example of a semiconductor device on which the power conversion circuit of the first and second embodiments is mounted. FIG. 10A is a block diagram of a semiconductor device in accordance with the third embodiment. A semiconductor device 30 includes a power conversion circuit 32, an input unit 34, a functional circuit 36, and an output unit 38. The semiconductor device 30 is, for example, a semiconductor chip or a package on which a semiconductor chip is mounted. The power conversion circuit 32 is the power conversion circuit according to the first or second embodiment. The input unit 34 is, for example, a pad provided on the semiconductor chip or a terminal provided to the package, and is supplied with electric power from an external device such as a vibration power generation device. The output unit 38 is, for example, a pad provided on the semiconductor chip or a terminal provided to the package, and supplies the power converted by the power conversion circuit 32 to an external device. The functional circuit 36 is a circuit related to the power conversion circuit, and includes, for example, at least part of the following components: the control circuits 20, 20a, or 20b that controls the power conversion circuit, the Vth setting circuit 24, and the current detection circuit 26.

In the case that the semiconductor device 30 is a semiconductor chip, a transistor constituting a switch of the power conversion circuit 32, a capacitor, and an inductor are formed on a semiconductor substrate such as a silicon substrate. At least part of the following components: a transistor, a diode, and a passive element constituting the functional circuit 36 is formed on the semiconductor substrate.

In the case that the semiconductor device 30 is a package on which a semiconductor chip is mounted, in the semiconductor chip, a transistor constituting a switch of the power conversion circuit 32, and at least part of the following components: a transistor, a diode, and a passive element constituting the control circuit 20, 20a, or 20b, the Vth setting circuit 24, and the current detection circuit 26 as the functional circuit 36 are formed. At least part of the elements (for example, an inductor and a capacitor), which are not formed in the semiconductor chip, of the power conversion circuit 32 may be mounted on the package.

First Variation of Third Embodiment

Figure 10B:
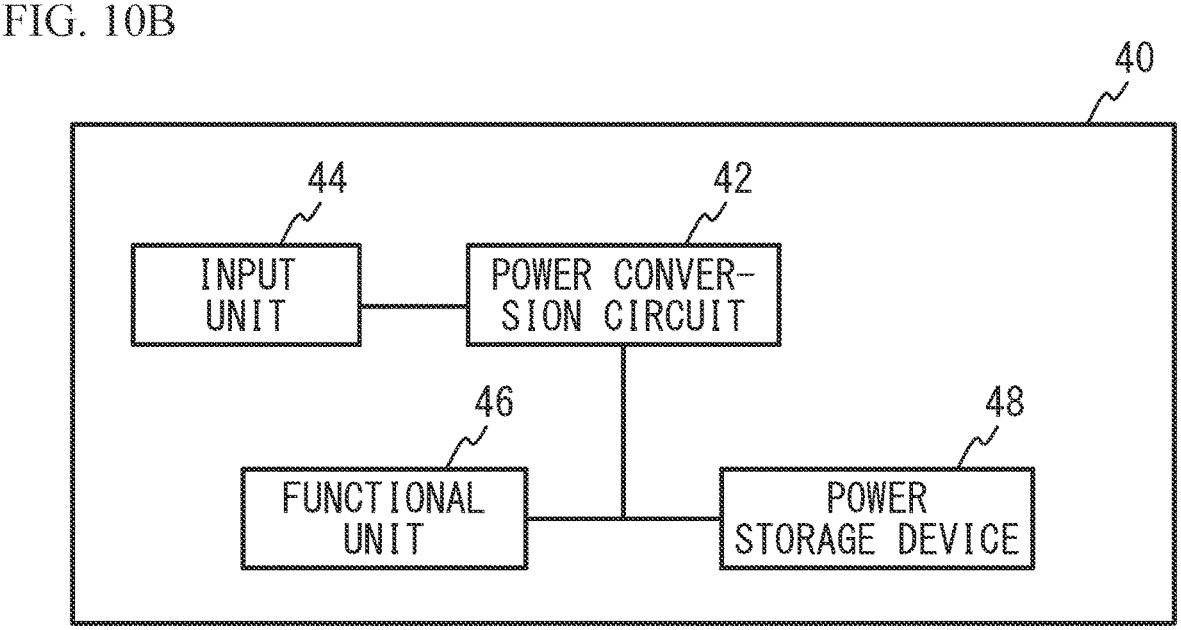
FIG. 10B is a block diagram of an electronic device in accordance with a first variation of the third embodiment.

A first variation of the third embodiment is an example of an electronic device equipped with the power conversion circuit according to the first and second embodiments. FIG. 10B is a block diagram of an electronic device according to the first variation of the third embodiment. An electronic device 40 is an electronic device that functions by an energy harvesting device such as a vibration power generation device, and is a street lamp, a display board, or an environmental measurement device such as a rain gauge.

The electronic device 40 includes a power conversion circuit 42 of the first and second embodiments, an input unit 44, a functional unit 46, and a power storage device 48. The power conversion circuit 42 is the voltage conversion circuit 10, 10a, or 10b according to the first or second embodiment. The input unit 44 is, for example, a terminal, and is supplied with electric power from an external device such as a vibration power generation device. The power storage device 48 is, for example, a secondary battery or a capacitor, and stores the electric power converted by the power conversion circuit 42. The power converted by the power conversion circuit 42 or the power stored in the power storage device 48 is supplied to the functional unit 46, and the functional unit 46 exhibits its function.

As in the third embodiment, the power conversion circuit 32 may be mounted on the semiconductor device 30. As in the first variation of the third embodiment, the electronic device 40 may include the power conversion circuit 42. This configuration improves the power efficiency of the electronic device 40.

Although preferred embodiments of the present invention have been described so far, the present invention is not limited to those particular embodiments, and various changes and modifications may be made to them within the scope of the invention claimed herein.

DESCRIPTION OF REFERENCE NUMERALS 10, 10a, 10b voltage conversion circuit
12 rectifier circuit
14 vibration power generation device
20, 20a, 20b control circuit
22 comparator
24 Vth setting circuit
30 semiconductor device
36 functional circuit
40 electronic device
46 functional unit

What is claimed is:

1. A power conversion circuit comprising:
a voltage conversion circuit that starts a voltage conversion operation when an input voltage applied to an input terminal reaches a threshold voltage, the voltage conversion operation converting the input voltage and outputting a converted input voltage to an output terminal as an output voltage,
wherein the threshold voltage when an input current input to the input terminal is large is higher than the threshold voltage when the input current is small.

2. The power conversion circuit according to claim 1, further comprising:
a setting circuit that sets the threshold voltage based on the input current input to the input terminal so that the threshold voltage when the input current is large is higher than the threshold voltage when the input current is small; and
a determination circuit that determines whether the input voltage has reached the threshold voltage,
wherein the power conversion circuit starts the voltage conversion operation based on an output of the determination circuit.

3. The power conversion circuit according to claim 1, wherein the voltage conversion circuit includes:
a capacitor having one end coupled to the output terminal and another end coupled to a reference potential,
an inductor having one end coupled to the input terminal and another end coupled to either the one end or the another end of the capacitor, storing magnetic field energy when at least a part of the input current flows through the inductor as a first current, and inducing a second current by the magnetic field energy, and
a switching element that is turned on to cause the first current to flow through the inductor, and is OFF when the second current flows through the inductor.

4. The power conversion circuit according to claim 3, further comprising: a control circuit that turns on the switching element when the input voltage reaches the threshold voltage.

5. The power conversion circuit according to claim 1, wherein $0.3 \times Zout \leq Vth/Iin \leq 3 \times Zout$ is satisfied, where Zout represents an output impedance of a power supply coupled to the input terminal, and Vth represents the threshold voltage when the input current input to the input terminal is Iin.

6. A semiconductor device comprising:
the power conversion circuit according to claim 1; and
a functional circuit related to the power conversion circuit.

7. An electronic device comprising:
the power conversion circuit according to claim 1; and
a functional unit to which power is supplied from the power conversion circuit.

* * * * *